US012750377B2

(12) United States Patent
Liu et al.

(10) Patent No.: US 12,750,377 B2
(45) Date of Patent: Sep. 29, 2026

(54) DEPLOYING HANDWRITING RECOGNITION SERVERS FOR DIFFERENT SECURITY LEVELS

(71) Applicant: INTERNATIONAL BUSINESS MACHINES CORPORATION, Armonk, NY (US)

(72) Inventors: Su Liu, Austin, TX (US); Andrew R. Jones, Round Rock, TX (US); Yang Liang, Beijing (CN); Luis Osvaldo Pizana, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 233 days.

(21) Appl. No.: 18/055,872

(22) Filed: Nov. 16, 2022

(65) Prior Publication Data

US 2024/0163291 A1 May 16, 2024

(51) Int. Cl.
*H04L 9/40* (2022.01)

(52) U.S. Cl.
CPC .................................. *H04L 63/105* (2013.01)

(58) Field of Classification Search
CPC ..................................................... H04L 63/105
See application file for complete search history.

(56) References Cited

U.S. PATENT DOCUMENTS 9,485,097 B2 * 11/2016 Rakan ................. G06F 3/03545
10,740,601 B2 * 8/2020 Wang ........................ G09B 7/04
11,425,111 B2 * 8/2022 Smith ..................... G06F 21/74
(Continued)

FOREIGN PATENT DOCUMENTS

CN 101488859 A 7/2009
JP 2006011650 A * 1/2006
(Continued)

OTHER PUBLICATIONS

Dilmegani, Cem., "Handwriting Recognition in 2022: In-depth Guide", AI Multiple, https://research.aimultiple.com/handwriting-recognition/, originally published May 2, 2022, updated Aug. 23, 2022 (9 pages) (Year: 2022).
(Continued)

*Primary Examiner* — Mohammed Waliullah
(74) *Attorney, Agent, or Firm* — Tihon Poltavets, Esq; Kevin P. Radigan, Esq.; Heslin Rothenberg Farley & Mesiti P.C.

(57) ABSTRACT

Deploying handwriting recognition servers of different security levels is provided. The process includes establishing multiple security levels of processing handwriting recognition requests, and providing multiple handwriting recognition servers. A handwriting recognition server of the multiple handwriting recognition servers facilitates handwriting recognition analysis processing for a respective security level of the multiple security levels of processing handwriting recognition requests. The process further includes deploying the multiple handwriting recognition servers to multiple computing resources of a computing environment for processing respective security-level handwriting recognition requests.

20 Claims, 9 Drawing Sheets

(56) References Cited

U.S. PATENT DOCUMENTS

| | | | | |
|---|---|---|---|---|
| 2015/0137938 | A1* | 5/2015 | Slaby | G06V 40/1365<br>340/5.53 |
| 2018/0293434 | A1* | 10/2018 | Wang | G06F 18/214 |
| 2021/0042027 | A1* | 2/2021 | Lee | G06F 40/171 |
| 2022/0158848 | A1* | 5/2022 | Finke | H04L 9/3247 |
| 2022/0229889 | A1* | 7/2022 | Matysiak | G07C 9/30 |
| 2024/0061915 | A1* | 2/2024 | Liu | G06F 21/32 |
| 2024/0119164 | A1* | 4/2024 | Dave | G06F 21/604 |

FOREIGN PATENT DOCUMENTS

| | | | | |
|---|---|---|---|---|
| JP | 5347305 | B2 | 11/2013 | |
| KR | 20130010496 | A | 1/2013 | |
| KR | 101305029 | B1 | 9/2013 | |
| KR | 20170098617 | A | 8/2017 | |
| KR | 101950059 | B1 | 2/2019 | |
| KR | 20230113942 | A * | 8/2023 | G06V 30/19113 |

OTHER PUBLICATIONS

IBM Publication, "Handwriting Recognition Actions", publsihed Feb. 27, 2021, http://www.ibm.com/docs/en/datacap/9.1.6?topic=actions-handwriting . . . (5 pages) (Year: 2021).

IBM Publication, "Installing IBM Datacap Advanced Handwriting Recognition", published Jun. 23, 2022, http://www.ibm.com/docs/en/datacap/9.1.9?topic-recognition-installing . . . (2 pages) (Year: 2022).

IBM Publication, "Watson Natural Language Understanding", downloaded Nov. 15, 2022, https://ibm.com/cloud/watson-natural-landuage-understanding (9 pages) (Year: 2022).

Linux Foundation, "State of the EDGE 2021", published 2021 at https://www.equinix.com/resources/whitepapers/state-of-edge-report (96 pages) (Year: 2021).

Longbottom, Clive., "How to Implement Edge Computing in 5 Steps", Tech Accelerator, https://www.techtarget.com/iotagenda/tip/How-to-implement-edge-computing-in-5-steps, published Oct. 8, 2020, ( 6 pages) (Year: 2020).

Matcha, Anil Chandra Naidu., "How to Easily Doe Handwriting Recognition Using Machine Learning", Nanonets, https://nanonets.com/blog/handwritten-character-recognition/, downloaded Sep. 7, 2022 (36 pages) (Year: 2022).

Su et al., "Hybrid Architecture for Handwriting Perceptual Service based on Edge Computing", 2020 IEEE International Conference on SErvices Computing (SCCC), https://ieeexplore.ieee.org/document/9284639, downloaded Aug. 25, 2022 (pp. 454-456) (Year: 2020).

Treacy, Megan., "Computer Program Perfectly Replicates Your Handwriting", Treehugger, https://www.treehugger.com/computer-program-perfectlh-replicates-your-handwriting-4854903, updated Oct. 11, 2018 (7 pages) (Year: 2018).

Cem Dilmegani, "Handwriting Recognition Benchmark: LLMs vs OCRs", AI Multiple, Jan. 22, 2026, 15 pages, doi: https://aimultiple.com/handwriting-recognition.

Chen Y. et al., "Build a handwritten digit recognizer in Watson Studio and PyTorch", IBM, Nov. 19, 2018, 5 pages, doi: https://developer.ibm.com/technologies/data-science/patterns/handwritten-digit-recognizer-in-watson-studio-and-pytorch/.

* cited by examiner

DEPLOYING HANDWRITING RECOGNITION SERVERS FOR DIFFERENT SECURITY LEVELS

BACKGROUND

One or more aspects relate, in general, to enhancing processing within a computing environment, and in particular, to deploying handwriting recognition servers for different security levels within a computing environment.

In a cloud-based environment, edge computing (e.g., computing at or near a boundary) enables processing and/or storage of data to be provided at, or closer to, the device(s) were the operations are being performed. Accordingly, edge computing can eliminate the need for data to be processed or stored being transmitted to a central location (e.g., a central cloud server), which can be physically located a significant distance from the edge device(s). Although this configuration may not provide a substantial change from an individual device perspective, the large increase of Internet of Things (IoT) devices, and other electronic devices, including mobile devices, exponentially increases network requirements when utilizing cloud services, which can cause an increase in latency, potentially resulting in lower quality of service, higher bandwidth costs, etc. Advantageously, edge computing can assist in alleviating these issues.

Handwriting recognition analysis is the field of computer processing that provides a computer with an ability to interpret written text via, for instance, pattern recognition software or real-time recognition via optical scanning. In another embodiment, movements of a pen can be sensed online via a pen-responsive computer screen surface. Handwriting recognition services are used in a variety of applications, including, for instance, for identification, authentication, etc.

SUMMARY

Shortcomings of the prior art are overcome, and additional advantages are provided through the provision of a computer-implemented method which includes establishing multiple different security levels of processing handwriting recognition requests, and providing multiple handwriting recognition servers. A handwriting recognition server of the multiple handwriting recognition servers facilitates handwriting recognition analysis processing for a respective security level of the multiple security levels of processing handwriting recognition requests. The computer-implemented method further includes deploying the multiple handwriting recognition servers to multiple computing resources of a computing environment for processing respective security-level handwriting recognition requests.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

Figure 1:
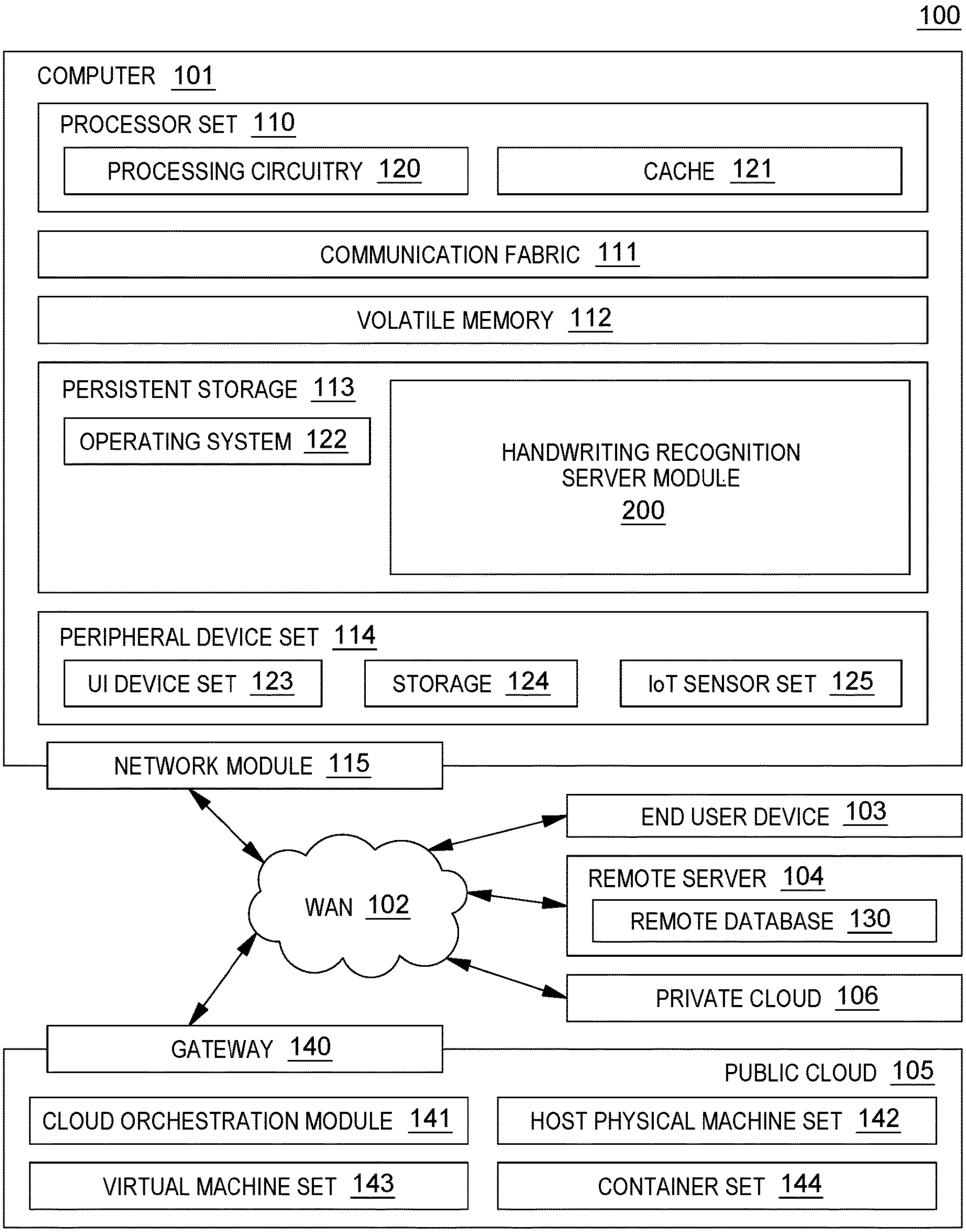
FIG. 1 depicts one example of a computing environment to include and/or use one or more aspects of the present invention.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1, including operating system 122 and handwriting recognition server module 200, which are stored in persistent storage 113.

One or more aspects of the present invention are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform automated handwriting recognition server deployment and processing. Aspects of the present invention are not limited to a particular architecture or environment.

Prior to further describing detailed embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as handwriting recognition server module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. Further, in one or more embodiments, one or more of the components/modules of FIG. 1 need not be included in the computing environment and/or are not used for one or more aspects of the present invention. Further, in one or more embodiments, additional and/or other components/modules can be used. Other variations are possible.

Figure 2:
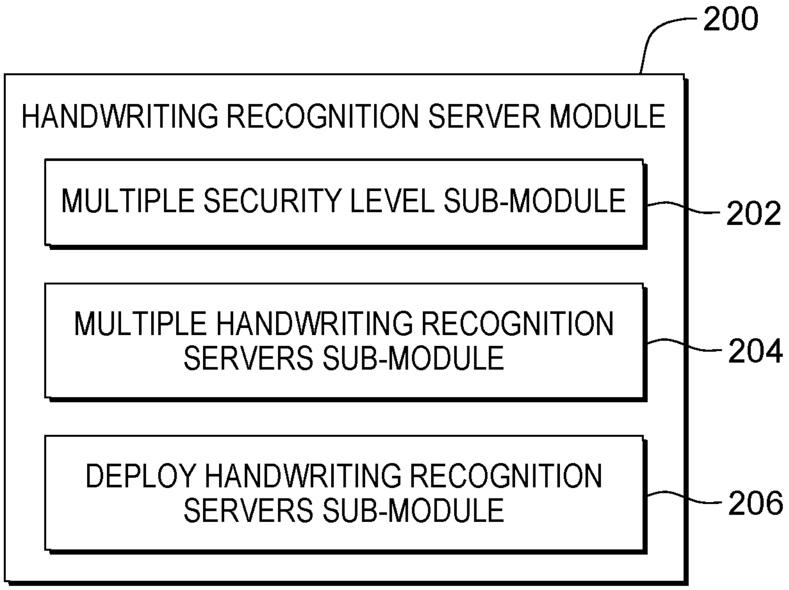
FIG. 2 depicts one embodiment of a computer program product containing a handwriting recognition server module, in accordance with one or more aspects of the present invention.
Figure 3:
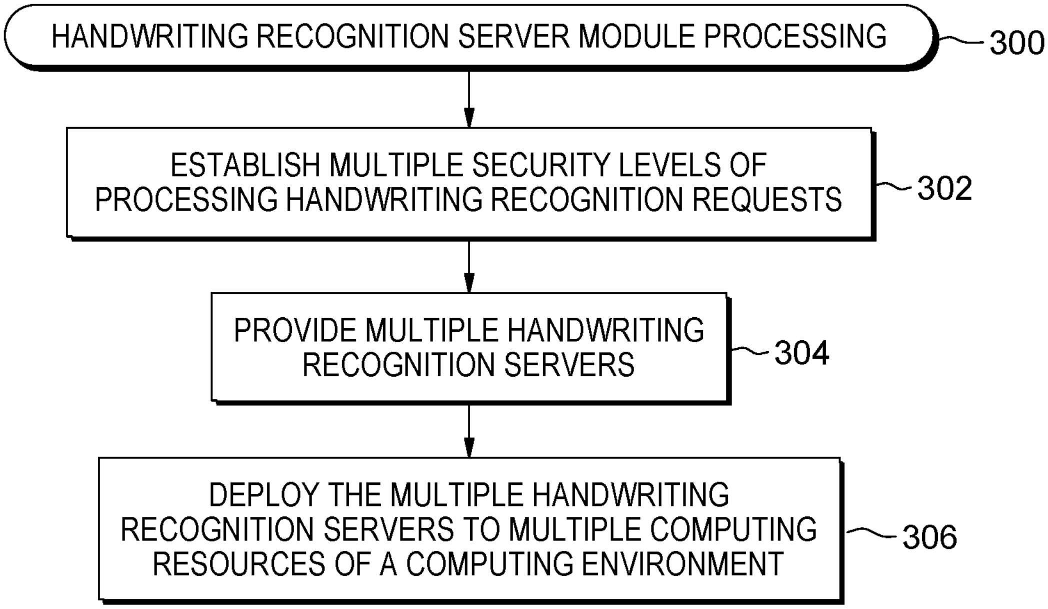
FIG. 3 depicts one embodiment of handwriting recognition server module processing, in accordance with one or more aspects of the present invention.

By way of example, one or more embodiments of a handwriting recognition server module are described initially with reference to FIGS. 2-3. FIG. 2 depicts further details of a handwriting recognition server module 200 that includes code or instructions used to perform handwriting recognition server module processing, in accordance with one or more aspects of the present invention, and FIG. 3 depicts one embodiment of a handwriting recognition server module process, in accordance with one or more aspects of the present invention.

Referring to FIGS. 1 & 2, handwriting recognition server module 200 includes, in one example, various sub-modules used to perform automated handwriting recognition server deployment, in accordance with one or more aspects of the present invention. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

In the FIG. 2 embodiment, example sub-modules of handwriting recognition server module 200 include, for instance, a multiple security level sub-module 202 to establish multiple security levels of processing handwriting recognition requests; a multiple handwriting recognition servers sub-module 204 to provide multiple handwriting recognition servers, where a handwriting recognition server of the multiple handwriting recognition servers facilitates handwriting recognition analysis processing for a respective security level of the multiple security levels of processing handwriting recognition requests; and a deploy handwriting recognition servers sub-module 206 to deploy the multiple handwriting recognition servers to multiple computing resources of a computing environment for processing respective security-level handwriting recognition requests. Note that although various sub-modules are described, automated handwriting recognition server deployment and processing such as disclosed herein can include additional, fewer, and/or different sub-modules. A particular sub-module can include additional code, including code of other sub-modules, or less code. Further, additional and/or other modules can be used. Many variations are possible.

In one or more embodiments, the sub-modules are used, in accordance with one or more aspects of the present invention, to perform handwriting recognition server module processing. FIG. 3 depicts one example of an automated handwriting recognition server module process, such as disclosed herein. The process is executed, in one or more examples, by a computer (e.g., computer 101 (FIG. 1)), and/or a processor or processing circuitry (e.g., of processor set 110 of FIG. 1). In one example, code or instructions implementing the process, are part of a module, such as handwriting recognition server module 200. In other examples, the code can be included in one or more other modules and/or in one or more sub-modules of the one or more other modules. Various options are available.

As one example, handwriting recognition server module processing 300 executing on a computer (e.g., computer 101 of FIG. 1), a processor (e.g., a processor of processor set 110 of FIG. 1), and/or processing circuitry (e.g., processing circuitry of processor set 110), establishes multiple security levels of processing handwriting recognition requests 302, and provides multiple handwriting recognition servers 304.

A handwriting recognition server of the multiple handwriting recognition servers facilitates handwriting recognition analysis processing for a respective security level of the multiple security levels of processing handwriting recognition requests. In one or more embodiments, handwriting recognition server module processing 300 further includes deploying the multiple handwriting recognition servers to multiple computing resources of the computing environment for processing respective security-level handwriting recognition requests 306.

As noted, handwriting recognition analysis refers to computer-implemented processing that provides a computer with an ability to interpret written text via, for instance, pattern recognition software or real-time recognition via optical scanning. In other embodiments, movements of a pen can be sensed online via a pen-responsive computer screen surface. Handwriting recognition analysis computer systems are typically machine-learning-based systems. Typically, handwriting recognition requests are to be connected to a machine learning process in real-time. A variety of handwriting recognition applications exist, including, for instance, those for mobile applications and services, identification, authentication, etc. As discussed herein, in a cloud-based environment, edge computing can assist with one or more aspects of handwriting recognition processing.

Factors impacting performance of computer-implemented handwriting recognition processing include character recognition accuracy, and continuous learning capabilities. A handwriting recognition system or process typically formats, performs correct segmentation into characters, and finds the most likely words for the segmented characters. Machine learning allows the handwriting recognition process to, for instance, improve accuracy with use.

Figure 4:
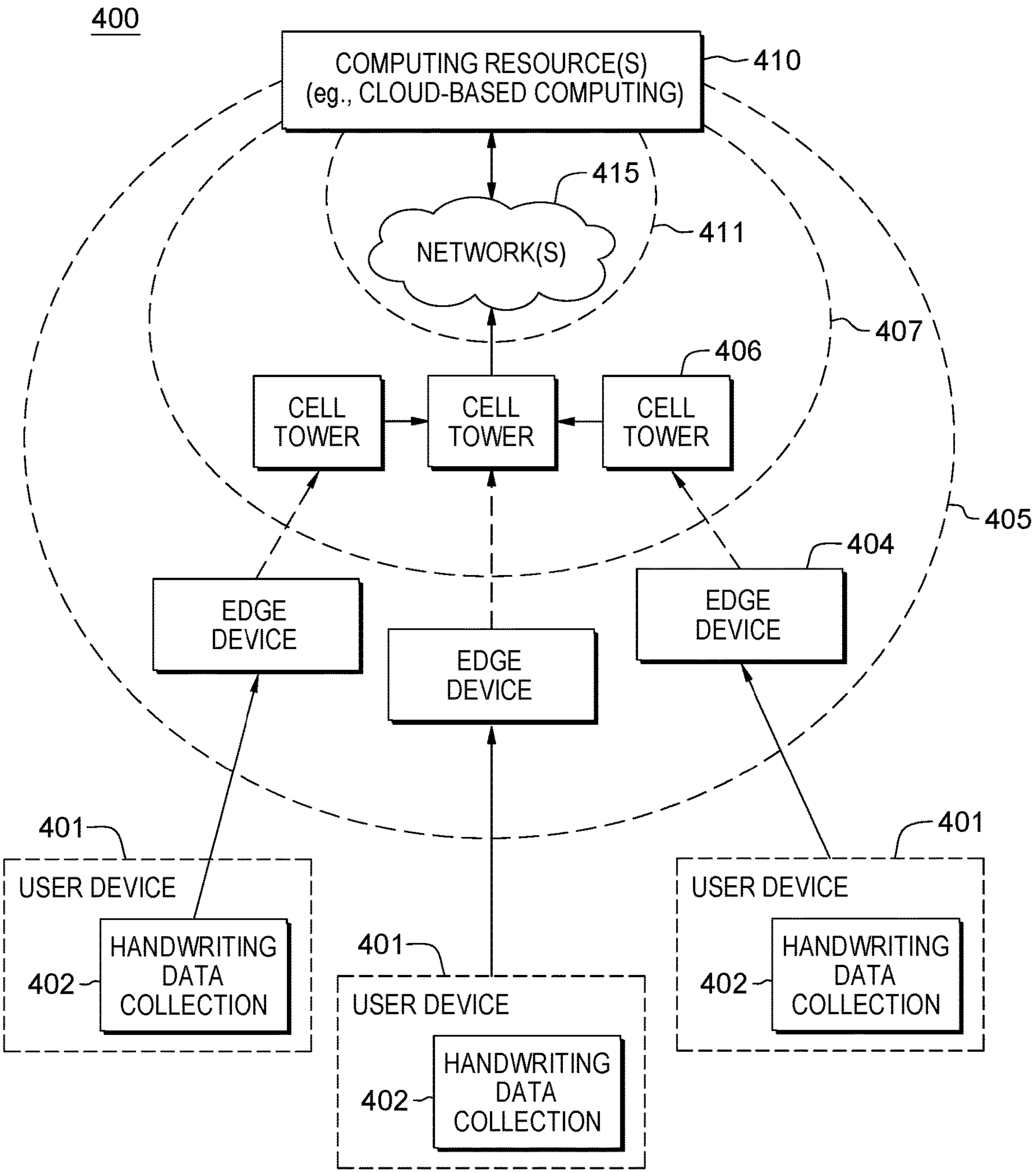
FIG. 4 depicts another example of a computing environment which can include and/or use one or more aspects of the present invention.

FIG. 4 depicts one example of a cloud-based computing environment 400 within which handwriting recognition server deployment processing in accordance with one or more aspects of the present invention can be implemented. In one or more embodiments, a user device 401, or user electronic device, such as a mobile device, can include a user interface, such as an electronic display device, which facilitates handwriting data collection 402, in one embodiment.

One approach to providing machine-learning-based handwriting recognition analysis is to provide machine learning-based handwriting recognition server software to execute on one or more centralized computing resources 410, such as one or more cloud-based computing resources. Those skilled in the art will understand that, in one or more embodiments, aspects of computing resource(s) 410, as well as computing environment 400 in general, can be the same or similar to those described above in connection with computer 101 and computing environment 100 of FIG. 1. Computing environment 400 depicts, by way of example, a technical environment or system into which various aspects of some embodiments of the present invention can be implemented.

By way of example, computing environment 400 includes, in addition to one or more computing resources 410, one or more edge devices or systems 404, as well as one or more user devices 401, such as one or more user electronic devices facilitating handwriting data collection 402. In one or more embodiments, user devices can be, or include, one or more wired or wireless user devices, such as one or more smartphones, mobile devices, gaming devices, wireless systems, computers, computer peripherals, etc., which may in use require handwriting recognition data analysis, for instance, for one or more applications executing on the user device.

Note that certain embodiments described herein refer to collecting user device data, such as handwriting data for recognition. To the extent that an implementation of the invention collects, stores, or employs personal information provided by, or obtained from, individuals, such information shall be used in accordance with all applicable laws concerning protection of personal information. Additionally, the collection, storage and use of such information may be subject to consent of the individual to such activity, for example, through "opt-in" or "opt-out" processes, as may be appropriate for the situation and type of information. Storage and use of information may be in an appropriately secure manner, reflective of the type of information, for example, through various encryption and/or anonymization techniques for sensitive information. In one or more implementations, a user can register to use, and thereby "obtain" access to a handwriting recognition server or process, such as disclosed herein.

In one embodiment, computing environment 400 can include a cellular network, such as a next generation cellular network, or 5G network, which wirelessly interfaces various types of user devices 401 to edge devices 404. For instance, the cellular network can include multiple edge sites, each with a respective cell tower 406 for wirelessly interfacing with various types of user devices within range of the cell tower. One or more of the edge sites can include a radio access network which interfaces the edge site computing infrastructure and, for instance, a next generation (5G) core network. The edge site computing infrastructure can be one example of edge device(s) 404, or can be separate from the edge device, depending on the implementation. In one embodiment, the next generation (5G) core network can include, for instance, a user plane function (UPF), which interfaces the radio access network(s), and a data network 415, such as a local-area network (LAN), a wide-area network (WAN), such as the Internet, or a combination thereof, and which can include wired, wireless, fiber-optic connections, etc. The network(s) 415 can include one or more wired and/or wireless networks that are capable of receiving and transmitting data, such as data related to one or more of the aspects referenced herein.

As can be appreciated from the embodiment of FIG. 4, collected handwriting data 402 is transferred across multiple different location-based processing levels, 405, 407, 411, in an implementation where handwriting recognition data analysis services are implemented at centralized computing resource(s) 410. In many applications, handwriting data can be, or include, confidential data including, for instance, a user signature. Depending upon the computing environment, such as computing environment 100 of FIG. 1 and computing environment 400 of FIG. 4, the handwriting data can be vulnerable to interception, replication, or other misuse when in transit across or through different processing levels. Further, depending on the country, governmental regulations may be in place regarding the flow of confidential data, such as personal handwriting data. For instance, greater protection may be required if collected handwriting data is to be exported outside of a regulated country.

In one embodiment of computing environment 400 of FIG. 4, centralizing handwriting recognition analysis processing to, for instance, increase character recognition accuracy and increase continuous learning capabilities of the handwriting recognition server software, requires transfer of the collected handwriting data across multiple processing levels 405, 407, 411 of the computing environment, which as noted, can increase vulnerability of the handwriting data, and thereby reduce security. In contrast, processing collected handwriting data at an edge device can increase security and/or provide enhanced protection of the handwriting data, as well as potentially increase response performance, by reducing or eliminating any network communication delays.

Most handwriting input and handwriting recognition computer processes available are sever-based due to the compute-intensive nature of artificial intelligence, or machine learning, employed by the handwriting recognition data analysis process. Depending on the computing resource upon which the handwriting recognition server is to execute, different levels of handwriting recognition accuracy and learning capabilities can be provided. In one or more embodiments, a lower level of handwriting recognition accuracy is provided at an edge device, and a greater level of handwriting recognition accuracy is provided, for instance, a centralized computing resource, such as a cloud-based computing facility with the greater compute capability. Along with different levels of handwriting recognition accuracy, different levels of security in processing handwriting recognition requests are provided. In one embodiment, the most secure handwriting recognition processing occurs at or closer to, for instance, a user device or system originating the handwriting data collection, such as at an edge device of the computing environment, and a less secure level of processing handwriting recognition requests occurs at a centralized computing resource(s) to which the handwriting data is to be transferred, but where handwriting recognition accuracy and machine learning capabilities are greater.

As discussed, embodiments of the present invention include computer-implemented methods, computer systems, and computer program products, where program code executing on one or more processing circuits, such as processor set 110 of FIG. 1, performs, in part, handwriting recognition server deployment and processing which includes, for instance, establishing multiple security levels of processing handwriting recognition requests, and providing multiple handwriting recognition servers, where a handwriting recognition server of the multiple handwriting recognition servers facilitates handwriting recognition analysis processing for a respective security level of the multiple security levels of processing handwriting recognition requests. Further, the process includes deploying the multiple handwriting recognition servers to multiple computing resources of a computing environment for processing respective security-level handwriting recognition requests. In one or more embodiments, the deploying of the multiple handwriting recognition servers is across different location-based processing levels, such as processing levels 405, 407, 411 in the computing environment example of FIG. 4. In one or more embodiments, the multiple handwriting recognition servers are deployed in a hierarchy to computing resources at different location-based processing levels of the computing environment. Further, in one or more embodiments, the multiple handwriting recognition servers can be implemented with different levels of handwriting recognition accuracy in processing the handwriting recognition requests. As noted, in one or more implementations, the handwriting recognition servers being deployed utilize machine learning, such as for categorizing, classifying, assigning of handwriting recognition requests, and in performing handwriting recognition data analysis.

Machine learning (ML) provides computers with an ability to learn, or continue learning, without being pre-programmed. Machine learning utilizes algorithms that learn from data and create insights based on the data, such as for making decisions or predictions. In one or more embodiments, training data in machine learning is the data used to train a model or make a prediction and solve a problem, provide relevant recommendations, perform an action, etc., based on the particular application of the machine learning model.

Briefly described, in one embodiment, the computing resource(s) of a computing environment can include one or more processors, for instance, central processing units (CPUs). Also, the processor(s) can include functional components used in the integration of program code, such as functional components to fetch program code from locations, such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access one or more computing resources and/or databases, as required to implement the machine learning processing described herein. The components of the respective computing resource(s) can be coupled to each other via one or more buses and/or other connections. Bus connections can be one or more of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the Micro Channel Architecture (MCA), the Enhanced ISA (EISA), the Video Electronic Standard Association (VESA), local bus, and Peripheral Component Interconnect (PCI). Embodiments of a computing resource(s) (or edge device or system(s)), which can implement one or more aspects disclosed herein, are described by way of example with reference to, for instance, FIGS. 1 & 4.

In one embodiment, program code executes a machine learning agent that facilitates training one or more machine learning models. The machine learning models can be trained using one or more training datasets that can include a variety of types of data, depending on the model and the data sources. In one or more embodiments, the program code executing on the one or more computing resources applies machine learning algorithms of the machine learning agent to generate and train the model(s), which the program code then utilizes to make a decision, or a prediction, or perform a skill (e.g., provide a solution, make a recommendation, perform an action, etc.). In an initialization or learning stage, the program code trains one or more machine learning models using a received or obtained training dataset that can include, in one or more embodiments, handwriting recognition data obtained from a plurality of data sources, such as handwriting recognition data for one or more computer applications.

The training data or dataset used to train the model (in embodiments of the present invention) can include a variety of types of data, such as that generated or collected by one or more devices or computer systems in communication with the computing resource(s). Program code, in embodiments of the present invention, can perform machine learning analysis to generate data structures, including algorithms utilized by the program code to perform a machine learning skill, function, action, etc., associated with, for instance, handwriting recognition processing. As known, machine learning (ML) solves problems that cannot be solved by numerical means alone. In this ML-based example, program code extracts features/attributes from training data, which can be stored in memory or one or more databases. The extracted features are utilized to develop a predictor function, h(x), also referred to as a hypothesis, which the program code utilizes as a machine learning model. In identifying the machine learning model, various techniques can be used to select features (elements, patterns, attributes, etc.), including but not limited to, diffusion mapping, principal component analysis, recursive feature elimination (a brute force approach to selecting features), and/or a random forest, etc., to select the attributes related to the particular model. Program code can utilize a machine learning algorithm to train the machine learning model (e.g., the algorithms utilized by the program code), including providing weights for conclusions, so that the program code can train any predictor or performance function included in the machine learning model. The conclusions can be evaluated by a quality metric. By selecting an appropriate (e.g., a diverse) set of training data, the program code trains the machine learning model to identify and weight various attributes (e.g., features, patterns) that correlate to enhanced performance of the machine learning model.

In one or more embodiments, program code, executing on one or more processors, utilizes an existing cognitive analysis tool or agent (now known or later developed) to tune the model, based on data obtained from one or more data sources. In one or more embodiments, the program code can interface with application programming interfaces to perform a cognitive analysis of obtained data. Specifically, in one or more embodiments, certain application programing interfaces include a cognitive agent (e.g., learning agent) that includes one or more programs, including, but not limited to, natural language classifiers, a retrieve-and-rank service that can surface the most relevant information from a collection of documents, concepts/visual insights, tradeoff analytics, document conversion, and/or relationship extraction. In an embodiment, one or more programs analyze the data obtained by the program code across various sources utilizing, for instance, one or more of a natural language processor and/or classifier, retrieve-and-rank application programming interfaces, and tradeoff analytics application programing interfaces.

In one or more embodiments of the present invention, the program code can utilize a neural network to analyze training data and/or collected data to generate an operational machine-learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present invention, can utilize in implementing a machine-learning model, such as described herein.

Figure 5A:
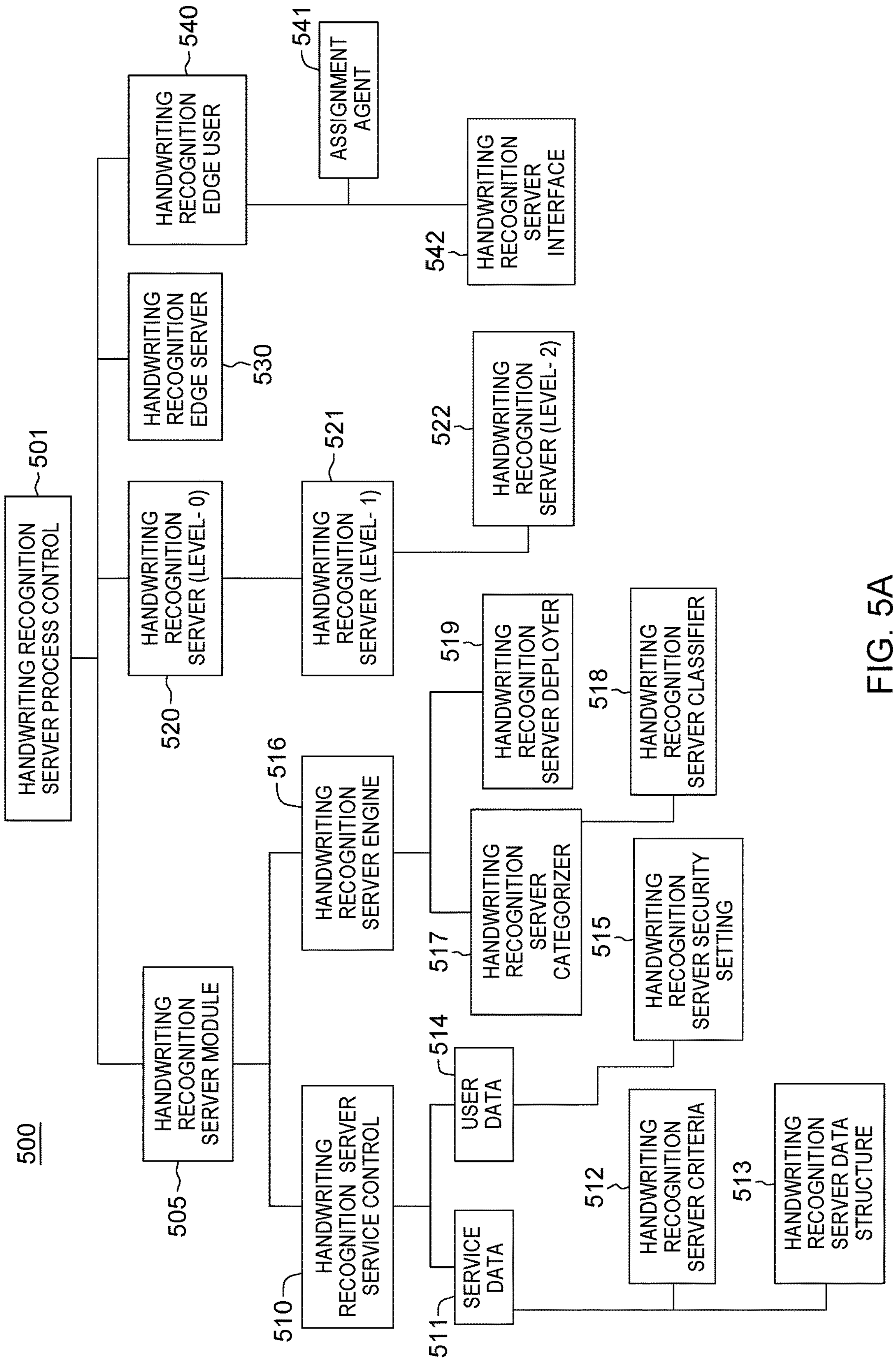
FIG. 5A depicts one embodiment of a computing environment including and/or using one or more aspects of the present invention.
Figure 5B:
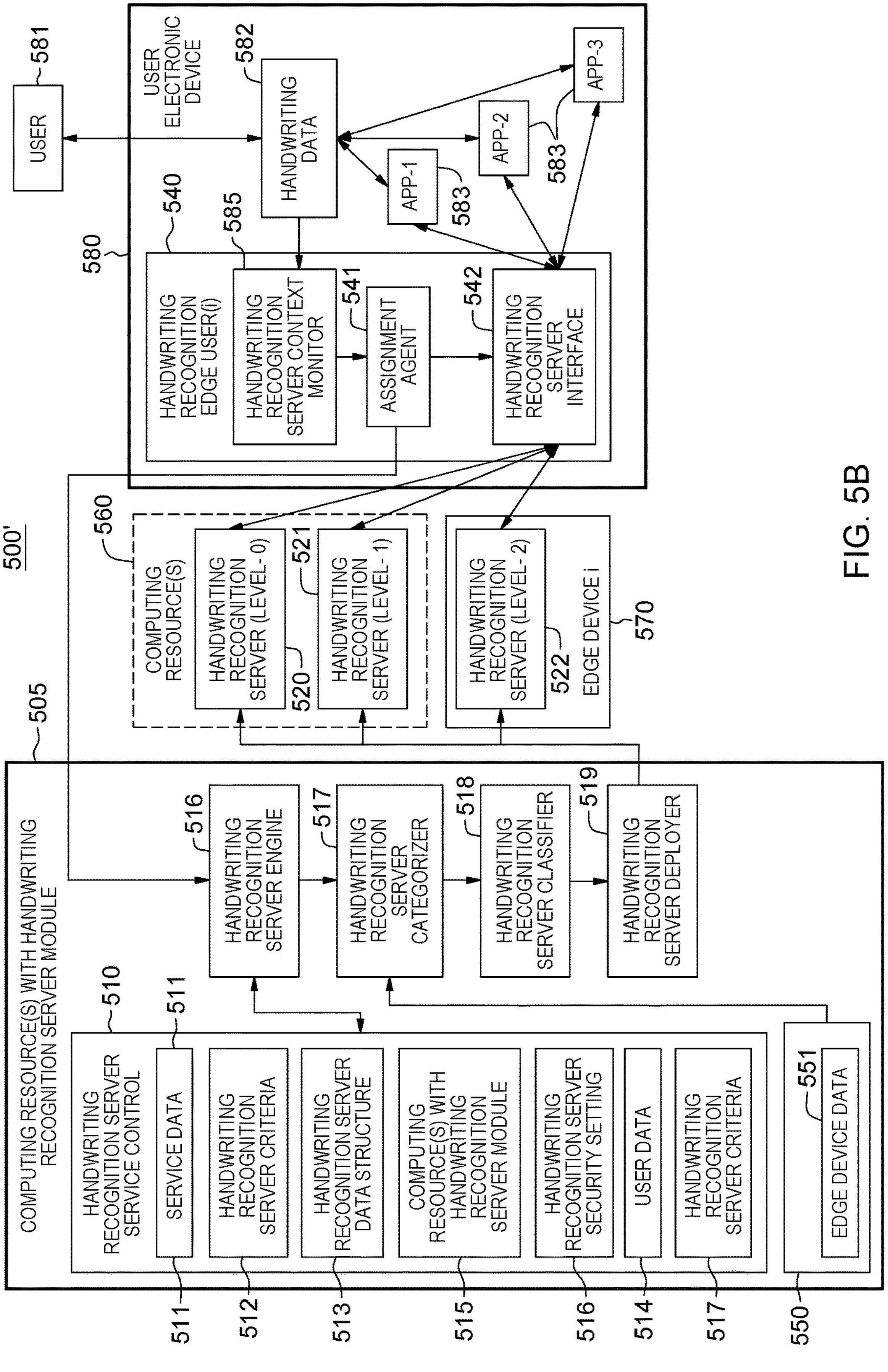
FIG. 5B depicts another example of a computing environment including and/or using one or more aspects of the present invention.

FIG. 5A depicts a detailed embodiment of a computing environment 500 with handwriting recognition server deployment and processing, in accordance with one or more aspects described herein. FIG. 5B depicts a further detailed implementation of a computing environment 500', such as, for instance, computing environment 500 of FIG. 5A, or computing environment 400 of FIG. 4, which can incorporate and/or use one or more aspects of the present invention. Those skilled in the art will understand that, in one or more embodiments, aspects of computing environments 500, 500' can also be the same or similar to those described above in connection with computing environments 100 of FIG. 1 and 400 of FIG. 4. Computing environment 500' depicts, by way of example, a technical environment or system into which various aspects of some embodiments of the present invention can be implemented. As illustrated, computing environment 500' includes, in one embodiment, one or more computing resource(s) executing or running a handwriting recognition server module 505, as well as computing resource(s) 560, one or more edge devices 570, and one or more user electronic devices 580, such as described herein.

Referring collectively to FIGS. 5A-5B, in one or more embodiments, a handwriting recognition server process control 501 is provided which facilitates determining a correct or optimized balance between handwriting recognition accuracy and protecting or securing confidential handwriting data depending, for instance, on the application, context, etc. In one or more implementations, the determined balance can enhance protection of a user's confidential handwriting data, while also enhancing a user's handwriting recognition experience using edge-based computing services, such as described herein. In one or more embodiments, the handwriting recognition server process control 501 includes program code implementing a hierarchical handwriting edge server management platform service, with both server-side and client-side (or user-side) modules or components. In the embodiment of FIGS. 5A & 5B, handwriting recognition server process control 501 includes handwriting recognition server module 505, which, in one or more embodiments, can be the same or similar to handwriting recognition server module 200 described above in connection with FIGS. 1-3.

In the embodiment illustrated in FIGS. 5A-5B, handwriting recognition server module 505 includes program code or sub-modules implementing handwriting recognition server service control 510 and handwriting recognition server engine 516. Handwriting recognition server service control 510 includes, or uses, in one embodiment, service-related data 511, and user-related data 514. In one or more embodiments, handwriting recognition server service control 510 is configured to allow, for instance, an administrator and/or user, to select and save a most-appropriate, or desired, handwriting security setting as service data 511 and/or user data 514. In one example only, the security setting can include for instance, App-1 [security level=0, accuracy level=10], App-2 [security level=10, accuracy level=0], App-3 [security level=5, accuracy level=5], etc. The security criteria can be based on one or more parameters associated with the request(s), such as identity of a particular user or application, context, service, etc.

In one or more embodiments, handwriting recognition server service control 510 allows a system administrator, a user, or other entity, to define a set of handwriting recognition server criteria 512 (such as a list of applications, URLs, processing locations, processing times, etc.) according to demands on the multiple security levels of processing handwriting recognition requests, and handwriting accuracy levels required, for instance, for each application and/or context (e.g., a location, time, language, script, etc.). In addition, a data structure 513 can be defined for saving and monitoring handwriting-recognition-related data. For instance, the data structure can include, in one embodiment, a user ID, user device ID, application ID (and/or a URL), security level, accuracy level, selected edge device ID (e.g., from edge device data 551 in database 550), handwriting input image data, request time, return text phrase, receive time, etc.

In one or more embodiments, handwriting recognition server process control 501 allows, according to security policy, an administrator or user (or other entity, organization, company, individual) to define a set of handwriting security management criteria, or handwriting recognition server security settings 515 (e.g., list of applications, URLs, locations, times, etc.), according to the demands on the security levels and handwriting accuracy levels for each application and/or one or more contexts (e.g., location, time, language, script, etc.).

As noted, handwriting recognition server module 505 includes, in one or more embodiments, handwriting recognition server engine 516 to facilitate, for instance, establishing, providing and deploying multiple handwriting recognition servers for processing respective security-level handwriting recognition requests. In the embodiment illustrated, the handwriting recognition server engine 516 program code includes handwriting recognition server categorizer 517 and handwriting recognition server classifier 518 to facilitate establishing multiple security levels of processing handwriting recognition requests. For instance, in one embodiment, handwriting recognition server categorizer 517 includes program code to facilitate categorizing different contexts or purposes of handwriting recognition requests associated with applications on one or ore user devices, and/or computing resources, to obtain categorized handwriting recognition requests. Establishing multiple security levels of processing handwriting recognition requests includes classifying, via handwriting recognition server classifier 518, the categorized handwriting recognition requests into the multiple security levels. A handwriting recognition server deployer 519 facilitates deploying multiple handwriting recognition servers (i.e., server software) to multiple computing resources of the computing environment for processing the respective security-level handwriting recognition requests. By way of example, handwriting recognition server engine 516 can deploy a handwriting recognition server to an edge device by, for instance, edge server ID, location ID, hardware model ID, etc., and can deploy different handwriting recognition servers with different capabilities to different levels, such as different location-based processing levels of the computing environment, for different security levels, such as described herein. For instance, FIGS. 5A & 5B depict handwriting recognition server (level-0) 520 and handwriting recognition server (level-1) 521 deployed to computing resource(s) 560 within computing environment 500', and handwriting recognition server (level-2) 522 deployed to an edge device, edge device i 570 of computing environment 500', which in one or more embodiments, can have different compute capabilities, and different levels of data protection.

In one or more embodiments, handwriting recognition server process control 501 further includes a handwriting recognition edge server 530, and a handwriting recognition server edge user (i) 540 of FIG. 5B, which can include, in one embodiment, handwriting recognition server context monitor 585, an assignment agent 541, and handwriting recognition server interface 542, with assignment agent 541 and handwriting recognition server interface 542 facilitating selection and forwarding of handwriting recognition requests for particular applications 583 of a user's electronic device 580 to selected handwriting recognition servers 520, 521, 522, by way of example. As illustrated in FIG. 5B, a user 581 provides handwriting data 582 for one or more applications (App-1, App-2, App-3) 583, which handwriting recognition edge user 540 communicates to the respective handwriting recognition edge server 530 for distribution to the appropriate handwriting recognition server level (level-0, level-1, level-2, etc.).

Figure 6:
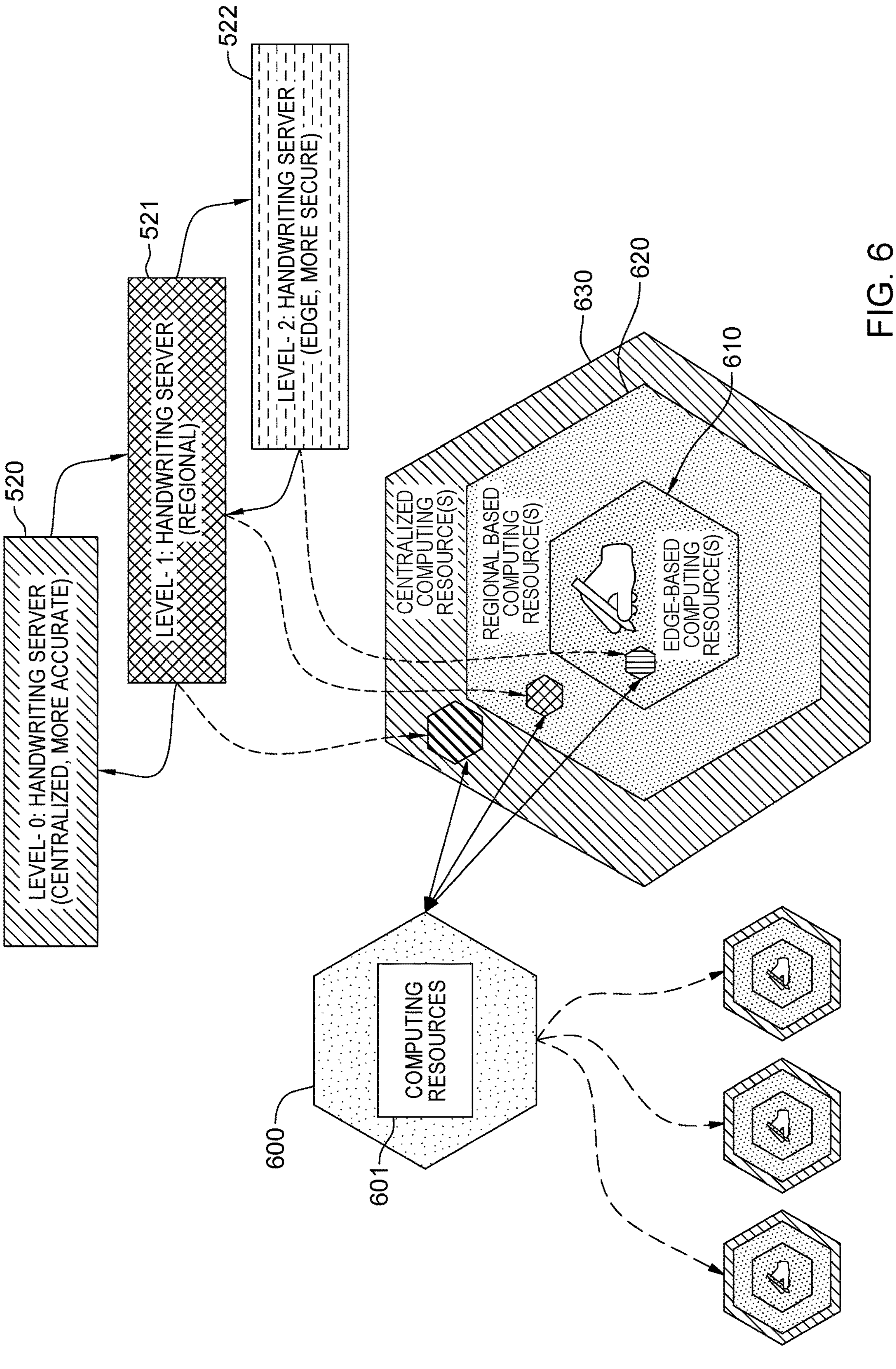
FIG. 6 is a further example of a computing environment to include and/or use one or more aspects of the present invention.

FIG. 6 depicts a further example of a computing environment to include and/or use one or more aspects of the present invention. By way of example, computing environment 600 includes computing resources 601 distributed within the computing environment at different location-based processing levels of the computing environment. Note, in this regard, that three different location-based processing levels are depicted by way of example only. In one or more other implementations, two, three, four, or more processing levels can be utilized within the computing environment. In one or more embodiments, computing environment 600 with computing resources 601 can be the same or similar to computing environments 500, 500' of FIGS. 5A & 5B, computing environment 400 of FIG. 4, and computing resources thereof, and/or computing environment 100 of FIG. 1, with computer 101, by way of example. In the example depicted, computing environment 600 includes one or more edge-based computing resources 610, one or more regional-based computing resources 620, and one or more centralized computing resources 630. In the embodiment depicted, the different location-based processing levels of the computing environment 600 include different handwriting recognition server security levels, including a level-0 handwriting recognition server for the centralized computing resources, a level-1 handwriting recognition server 521 for the regional-based computing resource(s) 620, and a level-2 handwriting recognition server 522 for the edge-based computing resource(s) 610. As depicted, the level-2 handwriting recognition servers 522 deployed to the edge-based computing resource(s) 610 provide the greatest security in processing the handwriting recognition requests, while the handwriting recognition servers 520 deployed to the centralized computing resource(s) 630 provide the greatest handwriting recognition accuracy and greatest machine learning capabilities, with the handwriting recognition servers 521 deployed to the regional-based computing resource(s) 620 containing a balance between greater processing security and more accurate handwriting recognition and machine learning capabilities.

Figure 7:
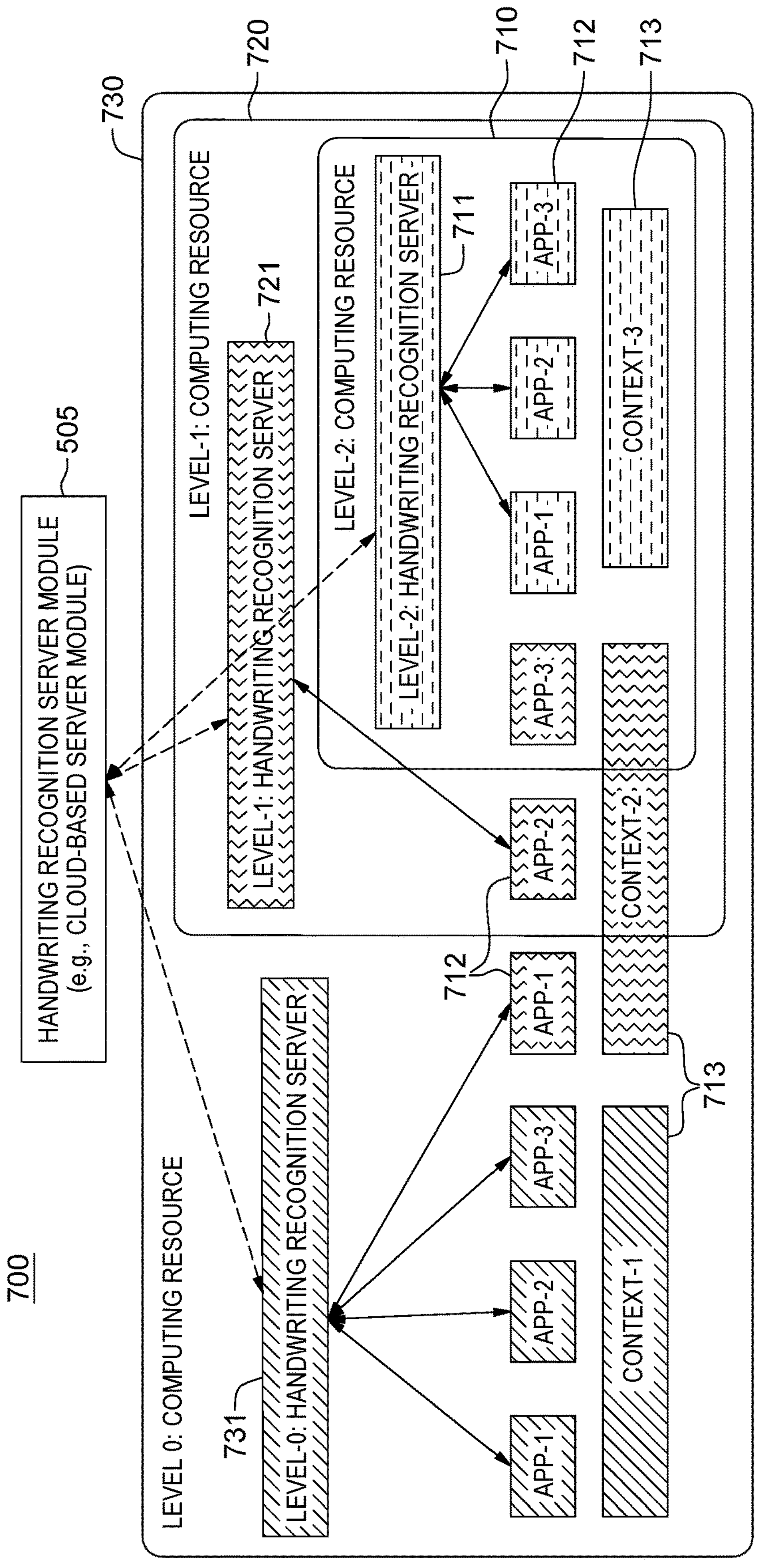
FIG. 7 is another example of a computing environment to include and/or use one or more aspects of the present invention.

FIG. 7 is a further example of a computing environment 700 to include and/or use one or more aspects of the present invention. Computing environment 700 can be the same or similar to computing environment 600 of FIG. 6, and/or computing environments 500 & 500' discussed above in connection with FIGS. 5A-5B, as well as computing environment 400 of FIG. 4, and/or can be the same or similar to computing environment 100 of FIG. 1. In the embodiment illustrated, computing environment 700 includes a handwriting recognition server module 505, such as a cloud-based server module which facilitates establishing of multiple security levels of processing handwriting recognition requests including, for instance, level-0, level-1 & level-2, by way of example only, and provides multiple handwriting recognition servers 711, 721, 731 for the different security levels to facilitate handwriting recognition analysis processing for each of the respective security levels of the multiple security levels of processing handwriting recognition requests. Further, handwriting recognition server module 505 facilitates deploying the multiple handwriting recognition servers 711, 721, 731 to the respective computing resource, such as level-2 computing resource(s) 710, level-1 computing resource(s) 720, and level-0 computing resource(s) 730, by way of example only.

In the example embodiment of FIG. 7, multiple computing applications, or applications, including app-1, app-2 & app-3 712, are shown executing in, or across, the multiple computing resources 710, 720 & 730, by way of example. Further, different contexts, including context-1, context-2 & context-3 713 are illustrated within and/or across the different computing resource levels. In one or more embodiments, the context refers to the purpose or environment within which the handwriting recognition request is generated for processing. The context can refer to the reason that a handwriting recognition request is being sent for processing. Note further, that in the computing environment example of FIG. 7, the applications and contexts are within the respective computing resource levels 710, 720 & 730, and further, as illustrated by context-2, a context can extend across multiple computing resource levels and multiple applications running on the different computing resource levels. By considering the application and contexts, a more precise balancing is achieved between those handwriting recognition requests requiring greater security (e.g., based on URL address, context, etc.) and those that have greater flexibility, and would benefit from enhanced handwriting recognition accuracy, as well as greater machine learning capabilities. In this manner, an enhanced approach is implemented for determining where to process handwriting recognition requests.

Figure 8A:
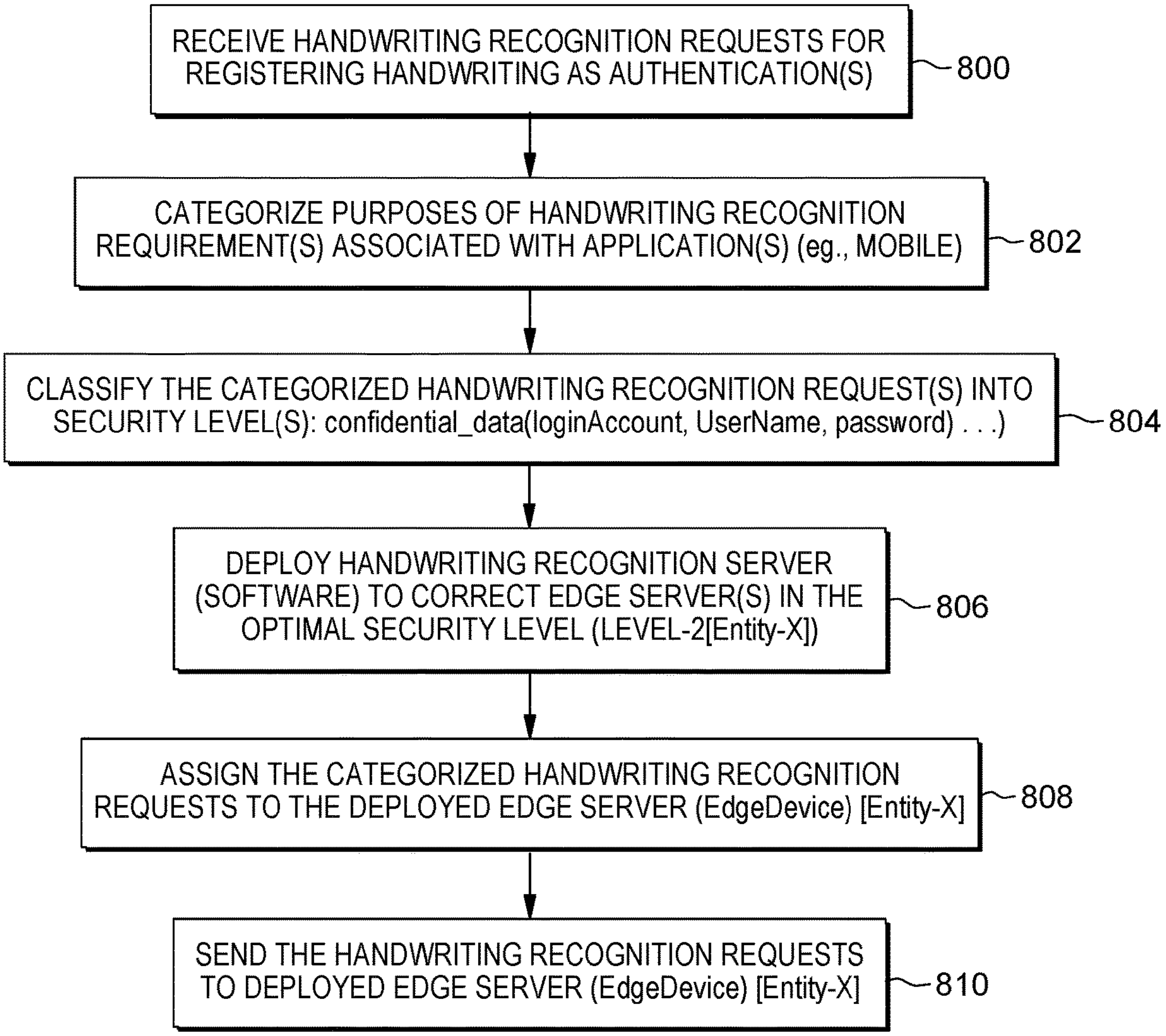
FIGS. 8A-8B are example embodiments of handwriting recognition server deployment and processing, in accordance with one or more aspects of the present invention.
Figure 8B:
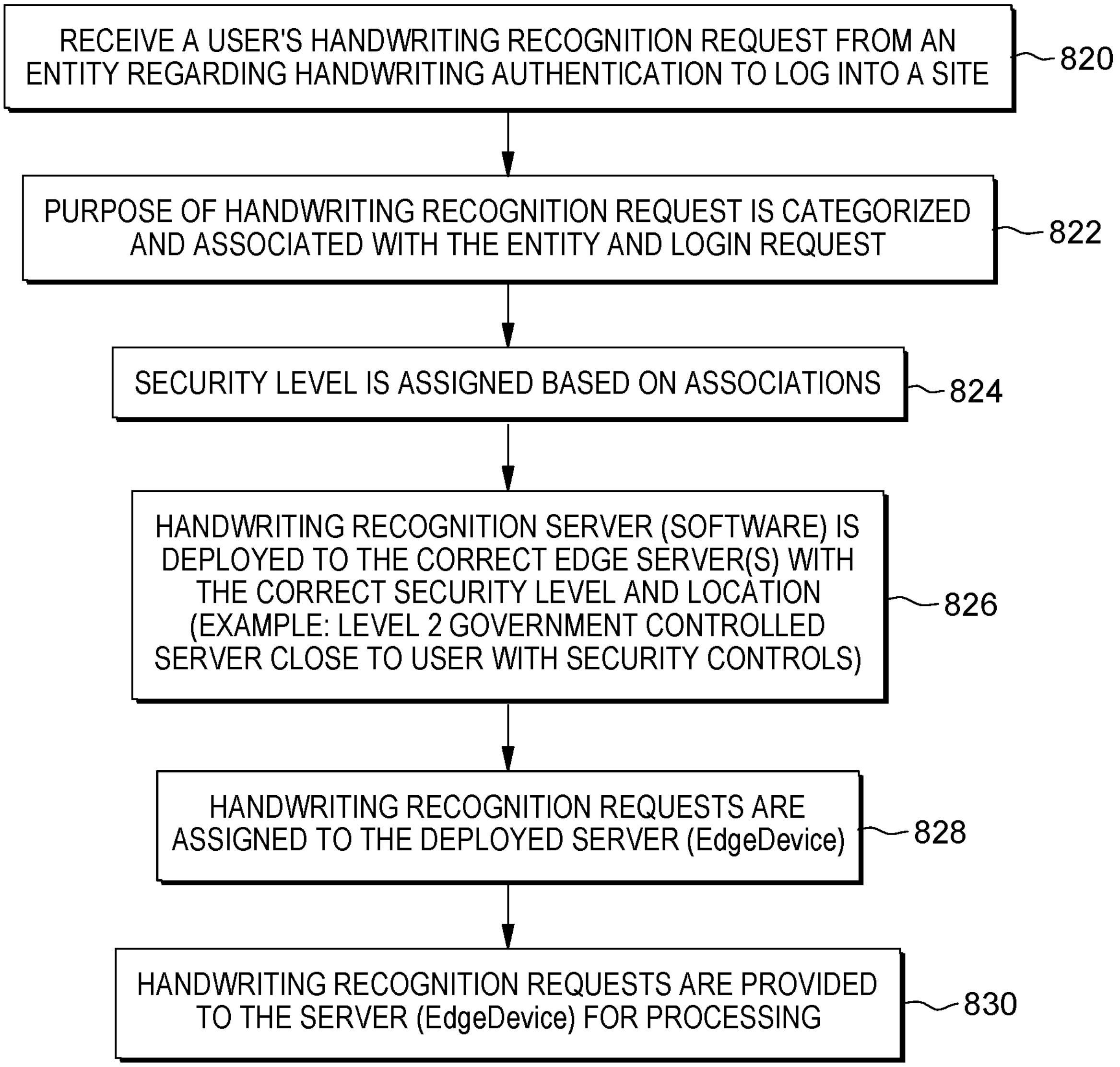

FIGS. 8A & 8B depict example embodiments of handwriting recognition server deployment and processing, in accordance with one or more aspects of the present invention.

Referring to FIG. 8A, handwriting recognition requests are received for, for instance, registering handwriting as an authentication 800. In one example, the authentication can be in association with accessing an account. The handwriting recognition server module processing categorizes purpose(s) of the handwriting requirement(s) associated with one or more applications, such as one or more mobile applications 802. The process classifies the categorized handwriting recognition requests into different security levels 804, such as confidential_data (login account, username, password . . . ). The handwriting recognition server software is deployed to the correct computing resource, such as the correct or optimized edge device or server, with the optimal security level (e.g., level-2 [entity-x]) 806. Note that in one or more embodiments, the computing resource or edge device to which the handwriting recognition server is deployed can be an edge device/system having enhanced protection for maintaining data confidentiality. For instance, the edge device to which the handwriting recognition server is deployed can be an entity's computing system which is protected by, for instance, a firewall. The categorized handwriting recognition requests can then be assigned to the deployed edge server (edge device [entity-x]) 808, with the handwriting recognition requests being sent to the deployed edge server (edge device [entity-x]) 810.

FIG. 8B depicts another embodiment of handwriting recognition server deployment and processing, in accordance with one or more aspects of the present invention. In this embodiment, a user's handwriting recognition request is received from an entity, such as a governmental entity, such as for handwriting authentication to log into a site 820. The purpose of the handwriting recognition request is categorized and associated with the entity and login request 822. A security level is assigned based on the determined associations 824. Handwriting recognition server software is then deployed to the correct computing resource(s), e.g., correct edge server(s), with the correct security level and location (e.g., level-2 government-controlled server close to user with security controls) 826. Handwriting recognition requests are then assigned to the deployed server (edge device) 828, and the handwriting recognition requests are provided to the handwriting recognition server (edge device) for processing 830.

Those skilled in the art will note from the description provided that computer-implemented methods, computer systems, and computer program products are disclosed for handwriting recognition server deployment and processing (or hierarchical handwriting edge server management) which facilitates determining an optimal balance between handwriting accuracy and data protection, that is, between protecting handwriting data, and enhancing a user's experience in using a handwriting recognition service. In one or more embodiments, the process includes defining a handwriting edge server distribution policy, according to a handwriting recognition request intention, to facilitate deploying a customized server for the request, and defining a computing resource or edge device selection mechanism according to, for instance, a handwriting recognition request intention, in order to map the server service in multiple levels to multiple handwriting recognition requests from users. Further, the process includes, in one or more embodiments, categorizing purposes of the handwriting requirements associated with one or more applications (e.g., public, guest, login, etc.), and classifying the categorized handwriting recognition requests into multiple security levels (no confidential data (shopping, searching, keywords), confidential data (login account, username, password) . . . ). Further, the process includes deploying a handwriting recognition server software to the computing resources (e.g., different edge servers) at different levels of the computing environment for different security levels. Note that the security level can associate to a user, an application, a device, a URL, content of the handwriting recognition requests, etc. Further, the process includes assigning the categorized handwriting recognition requests to different deployed servers, according to the different security levels, and sending each assigned handwriting recognition request to the correct handwriting recognition server.

In one or more embodiments, the process can further allow, according to a security policy, a user or other entity to define a set of handwriting security management criteria (list of apps, URLs, locations, times, etc.), according to demands on different security levels and handwriting accuracy levels in each application and/or each context (location, time language, script, etc.). Further, the process can allow an administrator and/or user to select and save a most appropriate handwriting security setting into saved service data, user data, and/or security setting data. In one or more embodiments, the process defines a hierarchical handwriting edge server management platform service. Further, the process can define or use a data structure for saving and tracking handwriting recognition server-related data. For instance, handwriting recognition server data can include a user ID, a device ID, an application ID (and/or URL), a security level, an accuracy level, a selected computing resource ID, a handwriting input image, a request time, a return text phrase, a received time, etc. In one or more embodiments, a handwriting recognition server deployment engine is provided to, at least in part, customize the handwriting recognition server software for deployment. In this manner, different handwriting recognition servers can be deployed to different levels of the computing environment for, for instance, different location-processing protection of the handwriting recognition data.

Other aspects, variations and/or embodiments are possible.

The computing environments described herein are only examples of computing environments that can be used. Other environments may be used; embodiments are not limited to any one environment. Although various examples of computing environments are described herein, one or more aspects of the present invention may be used with many types of environments. The computing environments provided herein are only examples.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of neural networks may be considered. Further, other scenarios may be contemplated. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

establishing multiple security levels of processing handwriting recognition requests;

providing multiple handwriting recognition servers, where a handwriting recognition server of the multiple handwriting recognition servers facilitates handwriting recognition analysis processing for a respective security level of the multiple security levels of processing handwriting recognition requests; and deploying, based on the established security levels, one or more handwriting recognition servers of the multiple handwriting recognition servers to a selected computing resource of a computing environment for processing respective security-level handwriting recognition requests, wherein the selected computing resource is selected based on a required security level of handwriting recognition requests associated with the one or more handwriting recognition servers.

2. The computer-implemented method of claim 1, further comprising categorizing different contexts of handwriting recognition requests associated with applications on the computing resources to obtain categorized handwriting recognition requests, the establishing comprising classifying the categorized handwriting recognition requests into the multiple security levels.

3. The computer-implemented method of claim 2, wherein the different contexts of handwriting recognition requests are associated with different purposes of the handwriting recognition requests.

4. The computer-implemented method of claim 1, wherein the deploying comprises deploying the multiple handwriting recognition servers in a hierarchy to computing resources at different processing levels of the computing environment.

5. The computer-implemented method of claim 4, wherein the different processing levels of the computing environment are different-location-based processing levels of the computing environment.

6. The computer-implemented method of claim 5, wherein at least one processing level of the different processing levels of the computing environment is at an edge device of the computing environment.

7. The computer-implemented method of claim 1, wherein establishing multiple security levels of processing handwriting recognition requests is in accordance with a set of handwriting security control criteria, wherein the handwriting security control criteria is selected from the group consisting of application-based security levels for handwriting recognition requests and context-based security levels for handwriting recognition requests.

8. The computer-implemented method of claim 1, wherein the multiple security levels of processing handwriting recognition requests are associated with one or more handwriting recognition request attributes, wherein the one or more handwriting recognition request attributes are selected from the group consisting of identification of users providing the handwriting recognition requests, applications associated with the handwriting recognition requests, user-devices associated with the handwriting recognition requests, addresses associated with the handwriting recognition requests, and request contexts associated with the handwriting recognition requests.

9. The computer-implemented method of claim 1, wherein the multiple handwriting recognition servers further provide different levels of handwriting recognition accuracy in processing the handwriting recognition requests.

10. A computer system for facilitating processing within a computing environment, the computer system comprising:

a memory; and at least one processor in communication with the memory, wherein the computer system is configured to perform a method, the method comprising:

establishing multiple security levels of processing handwriting recognition requests;

providing multiple handwriting recognition servers, where a handwriting recognition server of the multiple handwriting recognition servers facilitates handwriting recognition analysis processing for a respective security level of the multiple security levels of processing handwriting recognition requests; and deploying, based on the established security levels, one or more handwriting recognition servers of the multiple handwriting recognition servers to a selected computing resource of a computing environment for processing respective security-level handwriting recognition requests, wherein the selected computing resource is selected based on a required security level of handwriting recognition requests associated with the one or more handwriting recognition servers.

11. The computer system of claim 10, further comprising categorizing different contexts of handwriting recognition requests associated with applications on the computing resources to obtain categorized handwriting recognition requests, the establishing comprising classifying the categorized handwriting recognition requests into the multiple security levels.

12. The computer system of claim 10, wherein the deploying comprises deploying the multiple handwriting recognition servers in a hierarchy to computing resources at different processing levels of the computing environment.

13. The computer system of claim 12, wherein the different processing levels of the computing environment are different-location-based processing levels of the computing environment.

14. The computer system of claim 13, wherein at least one processing level of the different processing levels of the computing environment is at an edge device of the computing environment.

15. The computer system of claim 10, wherein establishing multiple security levels of processing handwriting recognition requests is in accordance with a set of handwriting security control criteria, wherein the handwriting security control criteria is selected from the group consisting of application-based security levels for handwriting recognition requests and context-based security levels for handwriting recognition requests.

16. The computer system of claim 10, wherein the multiple handwriting recognition servers further provide different levels of handwriting recognition accuracy in processing the handwriting recognition requests.

17. A computer program product for facilitating processing within a computing environment, the computer program product comprising:

one or more computer readable storage media and program instructions collectively stored on the one or more computer readable storage media readable by at least one processing circuit to perform a method comprising:

establishing multiple security levels of processing handwriting recognition requests;

providing multiple handwriting recognition servers, where a handwriting recognition server of the multiple handwriting recognition servers facilitates handwriting recognition analysis processing for a respective security level of the multiple security levels of processing handwriting recognition requests; and deploying, based on the established security levels, one or more handwriting recognition servers of the multiple handwriting recognition servers to a selected computing resource of a computing environment for processing respective security-level handwriting recognition requests, wherein the selected computing resource is selected based on a required security level of handwriting recognition requests associated with the one or more handwriting recognition servers.

18. The computer program product of claim 17, wherein the deploying comprises deploying the multiple handwriting recognition servers in a hierarchy to computing resources at different processing levels of the computing environment.

19. The computer program product of claim 18, wherein the different processing levels of the computing environment are different-location-based processing levels of the computing environment, and wherein at least one processing level of the different processing levels of the computing environment is at an edge device of the computing environment.

20. The computer program product of claim 17, wherein the multiple handwriting recognition servers further provide different levels of handwriting recognition accuracy in processing the handwriting recognition requests.

* * * * *